United States Patent
Huang

(10) Patent No.: US 8,718,424 B2
(45) Date of Patent: May 6, 2014

(54) EASILY ASSEMBLED OPTICAL SIGNAL TRANSMISSION DEVICE

(75) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 88 days.

(21) Appl. No.: 13/559,623

(22) Filed: Jul. 27, 2012

(65) Prior Publication Data

US 2013/0315535 A1 Nov. 28, 2013

(30) Foreign Application Priority Data

May 22, 2012 (TW) .............................. 101118109 A

(51) Int. Cl.
| | |
|---|---|
| *G02B 6/42* | (2006.01) |
| *G02B 6/12* | (2006.01) |
| *G02B 6/32* | (2006.01) |
| *G02B 6/02* | (2006.01) |
| *G02B 6/43* | (2006.01) |
| *G02B 6/125* | (2006.01) |
| *G02B 6/44* | (2006.01) |

(52) U.S. Cl.
CPC ............ *G02B 6/4214* (2013.01); *G02B 6/4249* (2013.01); *G02B 6/425* (2013.01); *G02B 6/43* (2013.01); *G02B 6/125* (2013.01); *G02B 6/4226* (2013.01); *G02B 6/4219* (2013.01)
USPC .................... 385/47; 385/14; 385/32; 385/33; 385/50; 385/52; 385/114; 385/129; 385/132; 385/123

(58) Field of Classification Search
CPC ...... G02B 6/4214; G02B 6/42; G02B 6/4226; G02B 6/4219; G02B 6/4249; G02B 6/425; G02B 6/43; G02B 6/122; G02B 6/4206
USPC ........... 385/14, 31–33, 39, 47, 49–52, 88–94, 385/114, 123, 129–132
See application file for complete search history.

(56) References Cited

U.S. PATENT DOCUMENTS 5,999,670 A * 12/1999 Yoshimura et al. ............. 385/31
7,058,266 B2 * 6/2006 Arakida et al. ................. 385/47

* cited by examiner

*Primary Examiner* — Uyen Chau N Le
*Assistant Examiner* — Michael Mooney
(74) *Attorney, Agent, or Firm* — Novak Druce Connolly Bove + Quigg LLP

(57) ABSTRACT

An optical signal transmitting device includes a substrate, light emitting modules, an optical coupling element, an optical fiber module, and a pressing pole. The substrate has a first loading surface and a second loading surface. The optical coupling element is positioned on the first loading surface and includes a first cladding portion and coupling lenses. Each coupling lens has a first sloped surface and a second sloped surface. The light emitting modules are positioned on the second loading surface and spatially correspond to the respective first sloped surfaces. The optical fiber module is positioned on the first loading surface and includes a second cladding portion and fiber cores. Each fiber core has a bare end. The pressing pole presses each bare end to the corresponding second sloped surface. The refractive indexes of the substrate, the coupling lenses, the fiber cores and the air are n1, n2, n3, n0, wherein n3>n2>>n1>n0.

11 Claims, 3 Drawing Sheets

EASILY ASSEMBLED OPTICAL SIGNAL TRANSMISSION DEVICE

BACKGROUND

1. Technical Field

The present disclosure relates to an optical signal transmission device.

2. Description of Related Art

Optical signal transmission devices include a number of converging lenses and a number of optical fibers corresponding to the converging lenses respectively. Each of the optical fibers has an incident surface. The converging lenses need to be aligned with the corresponding incident surfaces, and thus light rays converged by the converging lenses can directly enter the corresponding optical fiber. Limited to a relatively small area of each incident surface, it is not easy to align the converging lenses with the corresponding incident surfaces, resulting in relatively low assembly efficiency of the optical signal transmission devices.

Therefore, it is desirable to provide an optical signal transmission device that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
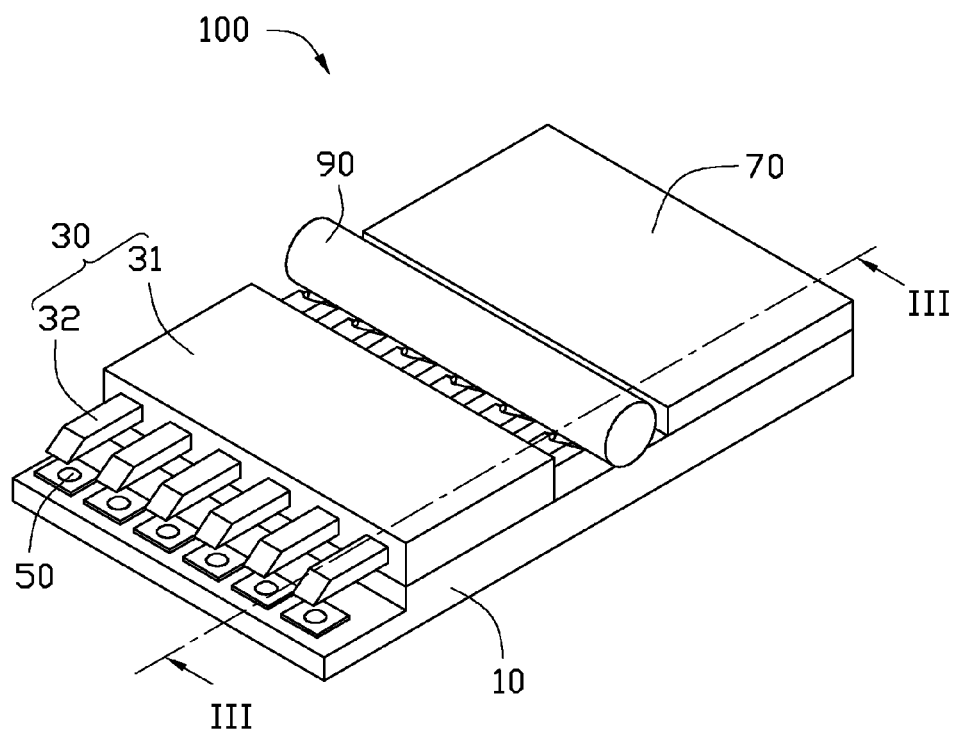
FIG. 1 is a schematic view of an optical signal transmission device, according to an exemplary embodiment.
Figure 2:
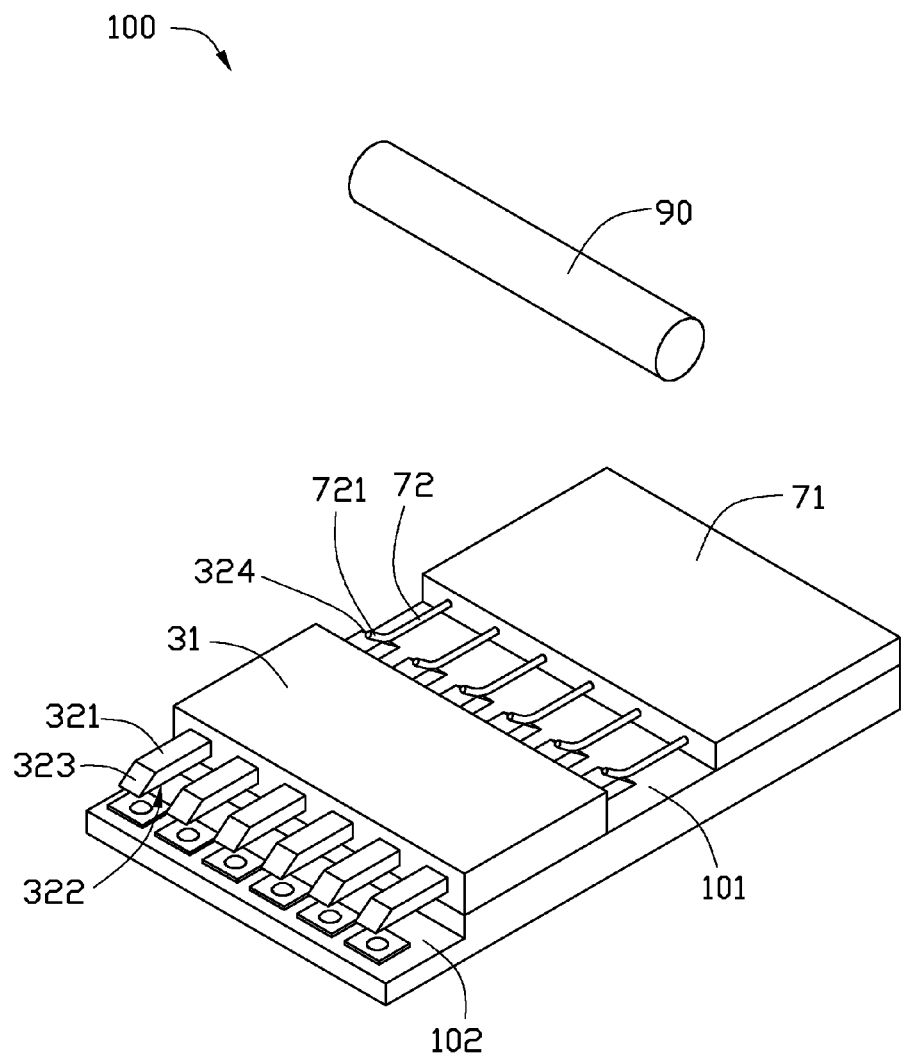
FIG. 2 is a schematic, partially exposed view of the optical signal transmission device of FIG. 1.
Figure 3:
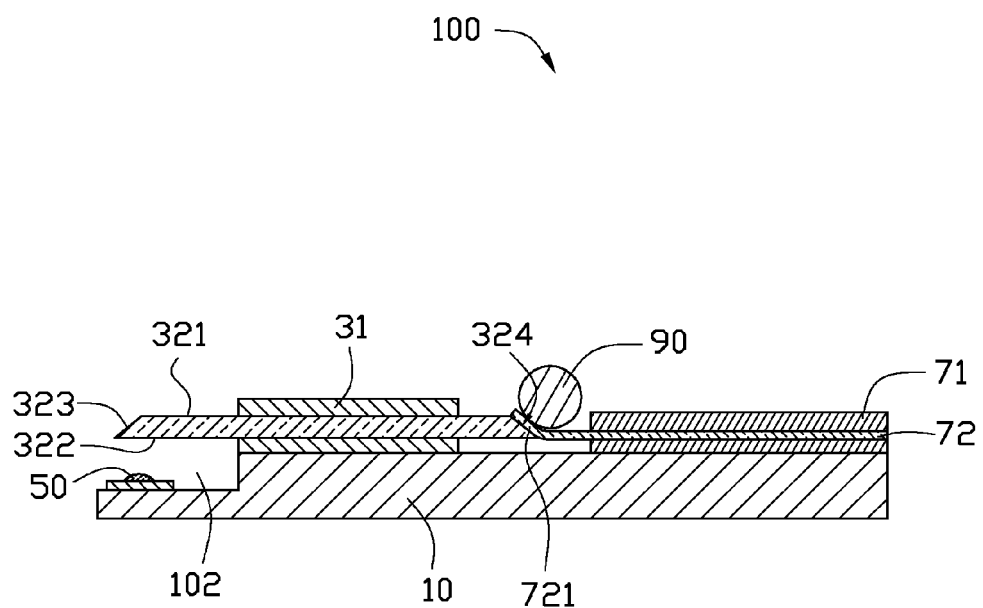
FIG. 3 is a cross-sectional view of the optical signal transmission device taken along a line III-III of FIG. 1.

FIGS. 1 to 3 illustrate an optical signal transmission device 100 in accordance to an embodiment. The optical signal transmission device 100 includes a substrate 10, an optical coupling element 30, a number of light emitting modules 50, an optical fiber module 70, and a pressing pole 90.

The substrate 10 is sheet-shaped and includes a first loading surface 101 and a second loading surface 102. The first loading surface 101 and the second loading surface 102 corporate to form a step-shaped structure. In the illustrated embodiment, the substrate 10 is a printed circuit board.

The optical coupling element 30 includes a first cladding portion 31 and a number of optical coupling lenses 32 passing through the first cladding portion 31. The first cladding portion 31 is substantially cuboid and is positioned on the first loading surface 101. Each of the coupling lenses 32 is substantially stripe-shaped and has an isosceles trapezoid cross-section along a longitudinal direction thereof. The longitudinal directions of the coupling lenses 32 are substantially parallel to each other. Each of the coupling lenses 32 has a top surface 321, a bottom surface 322, a first sloped surface 323, and a second sloped surface 324. The bottom surface 322 faces the second loading surface 102. The top surface 321 is opposite to and substantially parallel to the bottom surface 322. The second sloped surface 324 is opposite to the first sloped surface 323, and both of the first sloped surface 323 and the second sloped surface 324 are connected to the top surface 321 and the bottom surface 322. The first sloped surface 323 and the second sloped surface 324 extend outwards from the first cladding portion 31. A first included angle is formed between the first sloped surface 323 and the bottom surface 322, and a second included angle is formed between the second sloped surface 324 and the bottom surface 322. Both of the first included angle and the second included angle are acute angles. In this embodiment, both of the first included angle and the second included angle are about 45 degrees.

The light emitting modules 50 are positioned on the second loading surface 102 and are electrically connected to the substrate 10. The light emitting modules 50 share a same straight line and are spatially corresponding to the first sloped surfaces 323. Each of the light emitting modules 50 is aligned with a corresponding first sloped surface 323. In this embodiment, each of the light emitting modules 50 is a vertical cavity surface emitting laser (VCSEL).

The optical fiber module 70 includes a second cladding portion 71 and a number of fiber cores 72 passing through the second cladding portion 71. The second cladding portion 71 is positioned on the first loading surface 101. The longitudinal directions of the fiber cores 72 are substantially parallel to each other. The fiber cores 72 are spatially corresponding to the second sloped surfaces 324. Each of the fiber cores 72 includes a bare end 721 extending through the second cladding portion 71. The bare end 721 is positioned on the corresponding second sloped surface 324.

The pressing pole 90 is used for firmly pressing the bare ends 721 to the corresponding second sloped surfaces 324. In this embodiment, the longitudinal direction of the pressing pole 90 is substantially perpendicular to the longitudinal directions of the optical coupling lenses 32.

The refractive index of the substrate is n1, the refractive index of the optical coupling lens is n2, the refractive index of the fiber core is n3, and the refractive index of the air is n0, wherein n3>n2>>n1>n0>0.

In use, light rays from the light emitting modules 50 enter into the corresponding optical coupling lenses 32, and are reflected by the corresponding first sloped surfaces 323, then are reflected by the top surface 321 and the bottom surface 322 time and time again, and thus are transmitted to the corresponding second sloped surfaces 324. Because n3>n2>>n1>n0>0, and the bare ends 721 are firmly pressed on the corresponding second sloped surfaces 324 by the pressing pole 90, the light rays easily enter the fiber cores 72.

By employ the light transmission device 100, the area of the first sloped surface 232 is larger than that of the incident surface of each fiber core 72, and thus it is easy to align the light emitting modules 50 with the first sloped surface 323, and the assembly efficiency of the optical signal transmission device 100 can be effectively improved.

Furthermore, the gap between the bare end 721 and the second sloped surface 324 is reduced due to the pressing pole 90, therefore, the light energy loss will be reduced, and the transmission efficiency of the light rays will be improved.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical signal transmission device, comprising:
a substrate having a first loading surface and a second loading surface opposite to the first loading surface;
an optical coupling element positioned on the first loading surface and comprising:
a first cladding portion; and
a plurality of coupling lenses extending through the first cladding portion, each of the coupling lenses having a first sloped surface and a second sloped surface, both of the first sloped surface and the second sloped surface extending out of the first cladding portion;
an optical fiber module positioned on the first loading surface and comprising:
a second cladding portion; and
a plurality of fiber cores extending through the second cladding portion, each of the fiber cores having a bare end, the bare end optically coupled with the respective second sloped surface;
a plurality of light emitting modules positioned on the second loading surface, each of the light emitting modules spatially corresponding to the respective first sloped surface; and
a pressing pole pressing each bare end to the respective second sloped surface;
wherein a refractive index of the substrate is $n1$, a refractive index of the coupling lens is $n2$, a refractive index of the fiber cores is $n3$, a refractive index of the air is $n0$, and $n3>n2>>n1>n0>0$.

2. The optical signal transmission device of claim 1, wherein each of the coupling lenses further comprising a bottom surface and a top surface opposite to the bottom surface, both of the first sloped surface and the second sloped surface are connected to the top surface and the bottom surface.

3. The optical signal transmission device of claim 2, wherein the top surface is substantially parallel to the bottom surface.

4. The optical signal transmission device of claim 2, wherein the coupling lenses are strip-shaped; each of the coupling lenses has an isosceles trapezoid cross-section along its longitudinal direction.

5. The optical signal transmission device of claim 2, wherein a first included angle is formed between the first sloped surface and the bottom surface; a second included angle is formed between the second sloped surface and the bottom surface; both of the first included angle and the second included angle are acute angles.

6. The optical signal transmission device of claim 5, wherein both of the first included angle and the second included angle are about 45 degrees.

7. The optical signal transmission device of claim 2, wherein longitudinal directions of the coupling lenses are substantially parallel to each other.

8. The optical signal transmission device of claim 7, wherein a longitudinal direction of the pressing pole is substantially perpendicular to the longitudinal directions of the coupling lenses.

9. The optical signal transmission device of claim 1, wherein the light emitting modules are arranged in a same straight line.

10. The optical signal transmission device of claim 1, wherein the light emitting modules are vertical cavity surface emitting lasers.

11. The optical signal transmission device of claim 1, wherein the light emitting modules are electrically connected to the substrate.

* * * * *